2 Sheets-
Sheet 1.

H. Knight:
Cement Pipe Machinery.

No. 1,277. Reissued Feb. 25. 1862.

Witnesses
Benjamin Samuel
R. G. Cobbs.

Inventor
Henry Knight by
Thos. Hutchcroft & Sumner
his
Attorneys

H. Knight.

Cement Pipe Machinery.

No. 1277.

Reissued Feb. 25. 1862.

3 Sheets. Sheet 2.

Witnesses

Chas. Dalmal

R. L. Cobb

Inventor

Henry Knight.

by

Mason, Fenwick & Lawrence his Attorneys

H. Knight.
Cement Pipe Machinery.
No. 1,277.
Reissued Feb. 25. 1862.
3 Sheets.
Sheet 3.
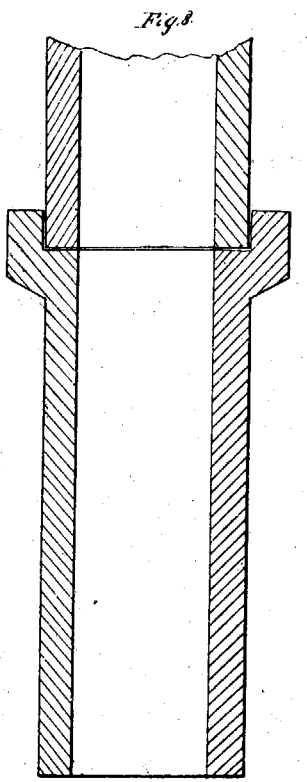
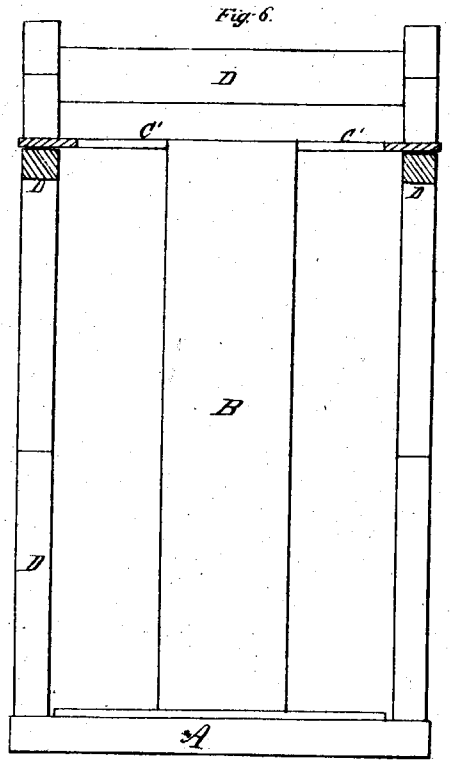
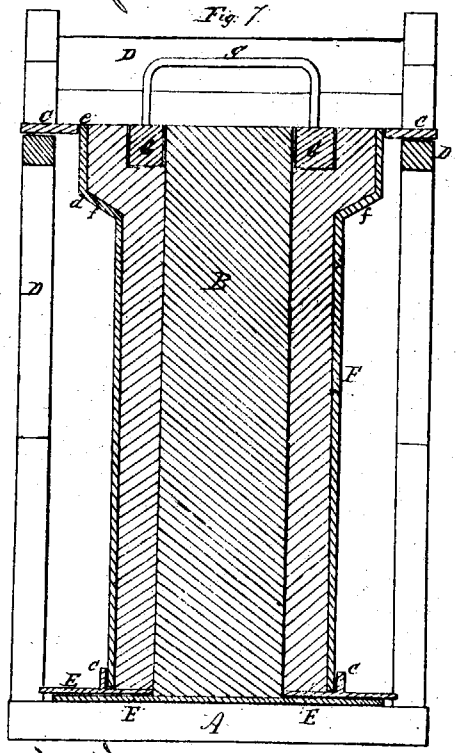
Witnesses
Eugene Chesnel
R. G. Cobb.
Inventor
Henry Knight.
by
Mason, Fenwick & Lawrence
his Attorneys

UNITED STATES PATENT OFFICE.

HENRY KNIGHT, OF JERSEY CITY, NEW JERSEY.

IMPROVEMENT IN MOLDS FOR MOLDING CEMENT PIPES.

Specification forming part of Letters Patent No. 28,184, dated May 8, 1860; Reissue No. 1,277, dated February 25, 1862.

*To all whom it may concern:*

Be it known that I, HENRY KNIGHT, of Jersey City, in the county of Hudson and State of New Jersey, have invented a new and useful Improvement in Means for Manufacturing Hydraulic-Cement Pipes; and I do hereby declare that the following is a full, clear, and exact description of the same, reference being had to the accompanying drawings, forming part of this specification, in which—

Figure 2:
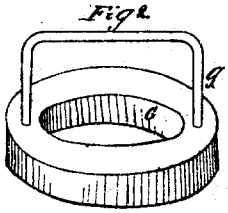
Figure 3:
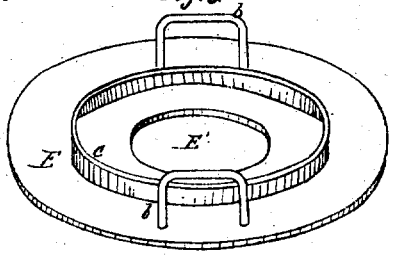
Figure 1:
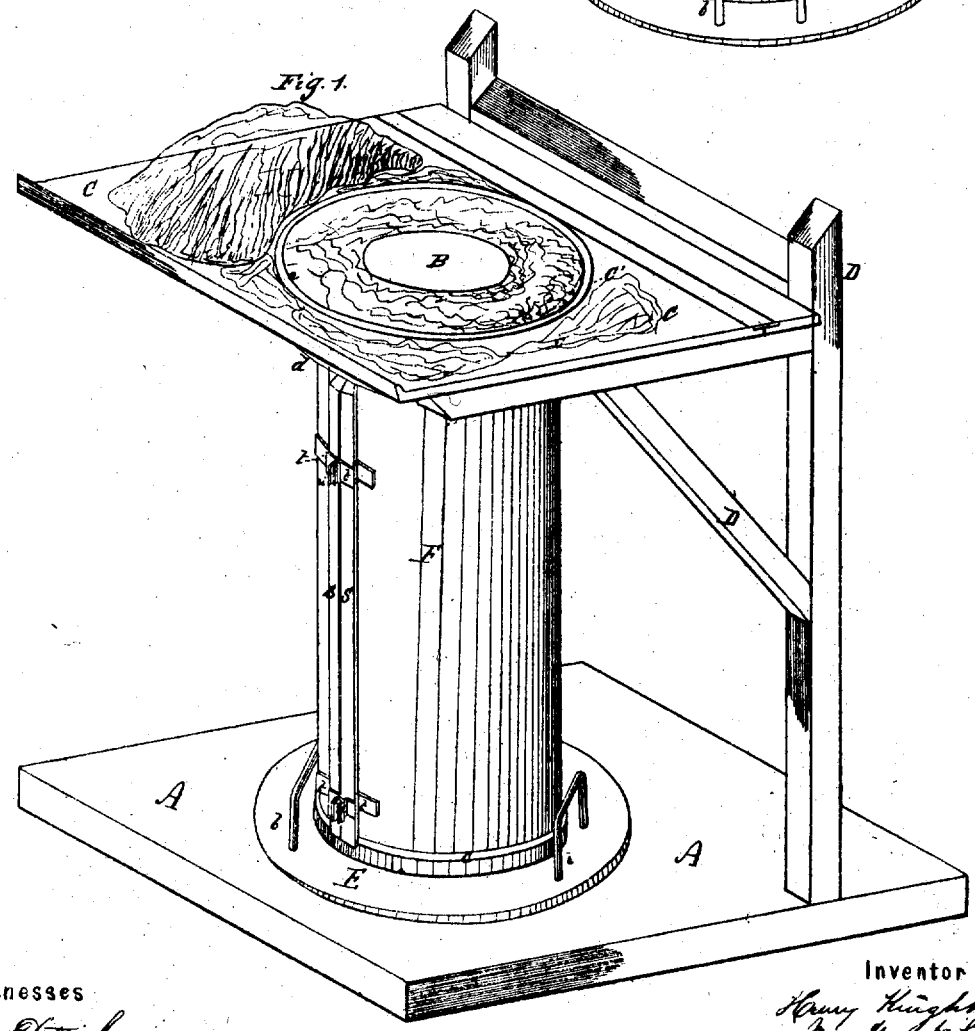
Figure 4:
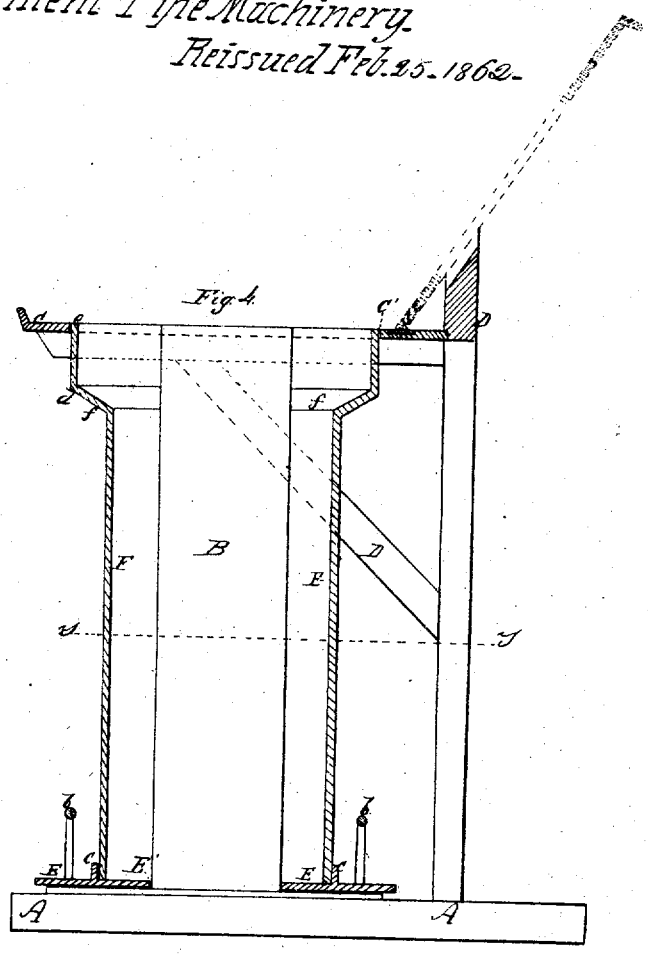
Figure 5:
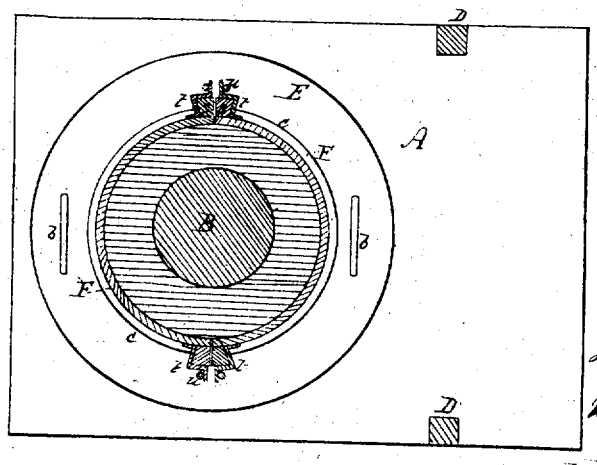

Figure 1 is a perspective view of the whole apparatus, excepting the detachable collar. Fig. 2 is a perspective view of the detachable collar. Fig. 3 is a perspective view of the detachable base-plate of the mold. Fig. 4 is a vertical central section of Fig. 1, and Fig. 5 a horizontal section of the same. Fig. 6 is a vertical section of the frame, showing the core in elevation with the mold removed from around it. This section is taken at right angles to Fig. 4. Fig. 7 is a vertical central section of the whole apparatus with a section of cement pipe molded in it. This section is also taken at right angles to Fig. 4. Fig. 8 is a longitudinal section of two pieces of pipe, produced by my improved means, jointed together.

Similar letters of reference in each of the several figures indicate corresponding parts.

The leading idea of my invention is the production of externally-collared and internally-square-shouldered hydraulic-cement pipe by molding vertically in metallic or other molds or flasks which are not built up at each operation of molding a section of pipe.

As practice has demonstrated that hydraulic-cement pipe answers a better purpose for underground drainage than metal or burnt-clay pipe, because it is free from liability to rust and is much cheaper than metal pipe and stronger and cheaper than even burnt-clay pipe, and also because it allows of branch connections being readily formed without danger of damaging the "main," my invention is of great utility, inasmuch as it enables me to furnish the market with a perfect substitute for the most approved style of metal pipe at small cost.

As improvements in means for manufacturing hydraulic-cement pipe by vertical molding, the nature of my invention consists, first, in the use of a stationary vertical core, or its equivalent, projecting up from the base of the machine, from which the cement pipe is raised, substantially as hereinafter described; second, in the combination of the detachable collar, or its equivalent, and a flask or exterior mold, constructed with two different diameters and with a horizontal or nearly horizontal shoulder, for the purpose of forming the vertically-molded cement pipe with an extending collar; third, in the use of the shouldered detachable base or bottom plate, or its equivalent, with lifting loops or eyes on its upper side; fourth, in the use of a detachable collar, or equivalent tool, for forming a right-angle or nearly right-angle socket within the collar portion of the vertically-molded pipe; fifth, in the use of an adjustable centering and cement-supporting table, in combination with a cement-pipe molding-machine; sixth, in the production by vertical molding, with means substantially such as hereinafter described, of sections of cement pipe with external collars which have right-angle or nearly right-angle sockets within them; seventh, in removing the molded pipe from the machine by raising it vertically.

To enable others skilled in the art to make and use my invention, I will proceed to describe the same within reference to the drawings.

A represents a platform on which the mold or molds are arranged. B is a central bar bolted firmly to the platform and projecting upward with a slight taper some three feet (more or less) from the same. This bar is designed as the core to the mold F, but it also serves for the detachable collar G, or its equivalent, to fit and move upon when said collar is arranged in position for forming a right-angle or nearly right-angle socket within the collar portion of a cement pipe.

E is a base or bottom to the mold F. It is disconnectible from the mold. Through its center a circular hole, E′, is cut, and from its top two or more lifting handles or loops, *b b*, project upward, and also a ring-bead, *c*. Instead of the ring-bead, a groove of about half an inch depth may be cut in the plate.

C is a hinged adjustable table, with a circular hole, C′, through its center. This table is a part of the frame D of the machine, and its office is twofold—viz., to center the mold and to support the cement which is being introduced into the same. It is hinged so that it may be thrown up out of the way when the mold, with cement pipe molded in it, is being moved off the platform A.

The mold F is made, preferably, of light metal in two parts, which have flanges *s s* at opposite sides, by which they are locked together through the aid of straps *t t* and wedge-staples *u u*. The mold at one end is made with an increased diameter, as shown at *d e*, and at the termination of the portion F a horizontal or nearly horizontal shoulder, *f*, extends outward and unites the portion *d e* with the portion F, as shown. The enlarged portion serves for forming an extending or projecting collar on one end of the cement pipe.

The removable tool G, for forming the right-angle or nearly-right angle socket within the collar of the pipe is of ring form, and has a handle, *g*, extending up from its top.

To adjust machine for making pipe with collars and right-angle sockets or shoulders, the hinged table is first thrown up and back to the position shown in red outlines. The base or bottom E of the mold is next slipped over the central bar, B, and made to find its rest on the base-flange thereof. Then the mold F is adjusted around the bar B and within the circular bead C. The hinged table is now brought down around the largest end of the mold, so as to center it and to serve for supporting the cement, as illustrated in black outlines. All the parts, excepting the collar G, being adjusted as shown in Figs. 1 and 4, the cement is placed upon the hinged table C, and therefrom is gradually forced into the mold and rammed compactly until the mold is filled to within a short distance of its top or of the terminus of the collar portion. At this stage the tool G is fitted on or around the central bar, B, and forced down by vertical and circular pressure into the cement until its upper surface comes even with upper termini of the bar B and mold F. This being done, I force and ram additional cement between the circumference of the tool G and the enlarged part of the mold until the cement rises level with the terminus of the mold, when with a trowel or other implement any surplus cement is struck off, the striking-tool being held in the hand or centered on the top of the center bar, B. The molding of the pipe is now completed, and as soon as the cement becomes "set" I proceed as follows to remove the pipe from the mold:

The hinged table C is first thrown up to the position shown in red. The collar or tool G is then withdrawn by first gently turning it slightly so as to loosen it, and then drawing it upward. The mold, with the pipe in it, is net raised by elevating the base-plate, on which it rests, by its handles until it clears the top of the central bar, B. The base-plate, with mold and pipe connected to it, is set upon the floor, and the mold, with pipe in it, is lifted until it frees itself from the base-plate. The base of the mold is now allowed to rest on the floor, and the fastenings which lock the two parts of the mold together are gently withdrawn, and while gently tapping the upper portion of the mold the sections or two parts are separated laterally, and the pipe left standing on its smallest end. Thus operating, I make a pipe with ends or corners perfectly whole or unbroken, for the base-plate enables me to draw the mold, with the pipe in it, over the central bar, it supporting the cement pipe until and after it is clear of the top of said bar. Without the aid of the base-plate with circular bead, or its equivalent, a groove, and lifting, handles, it would be necessary, as usual, to draw the core from the mold, and in doing this the ends or corners of the pipe are very frequently broken off, and difficulty consequently attends the formation of a perfectly-tight line of drain-pipes. I also am enabled to form sockets with right-angle or nearly right-angle shoulders in one end of each section of pipe, and thus make a more perfect, close, and permanent joint than is obtained with the male and female bevels formed on the ends of the hydraulic-cement pipes in use.

What I claim as an improvement in means or method of manufacturing hydraulic-cement pipe by vertical molding, and desire to secure as my invention by Letters Patent, is—

1. The use of a vertical stationary central core, or its equivalent, substantially as and for the purpose set forth.

2. The combination of the detachable collar G, or its equivalent, and a flask or exterior mold, F *d e*, constructed with two different diameters and with a shoulder, *f*, or its equivalent, for the purpose set forth.

3. The use of the shouldered detachable base or bottom E, substantially as and for the purposes set forth.

4. The use of a detachable collar or tool, G, or its equivalent, for forming a right-angle or nearly right-angle socket within one end of the cement pipe, substantially as and for the purposes set forth.

5. The use of an adjustable perforated centering-table, in combination with a cement-pipe machine, substantially as and for the purposes set forth.

6. Producing by vertical molding, with means substantially such as described, sections of cement pipe with external collars and right-angle or nearly right-angle sockets, as set forth.

7. Removing the molded cement pipe from the machine by raising it vertically, substantially as set forth.

HENRY KNIGHT.

Witnesses:
DENNIS FARRELL,
JAMES CRAWFORD.